F. H. HARPSTER.
AUTOMATIC PIPE COUPLING FOR CARS.
APPLICATION FILED MAY 26, 1909.
950,263.
Patented Feb. 22, 1910.
2 SHEETS—SHEET 1.
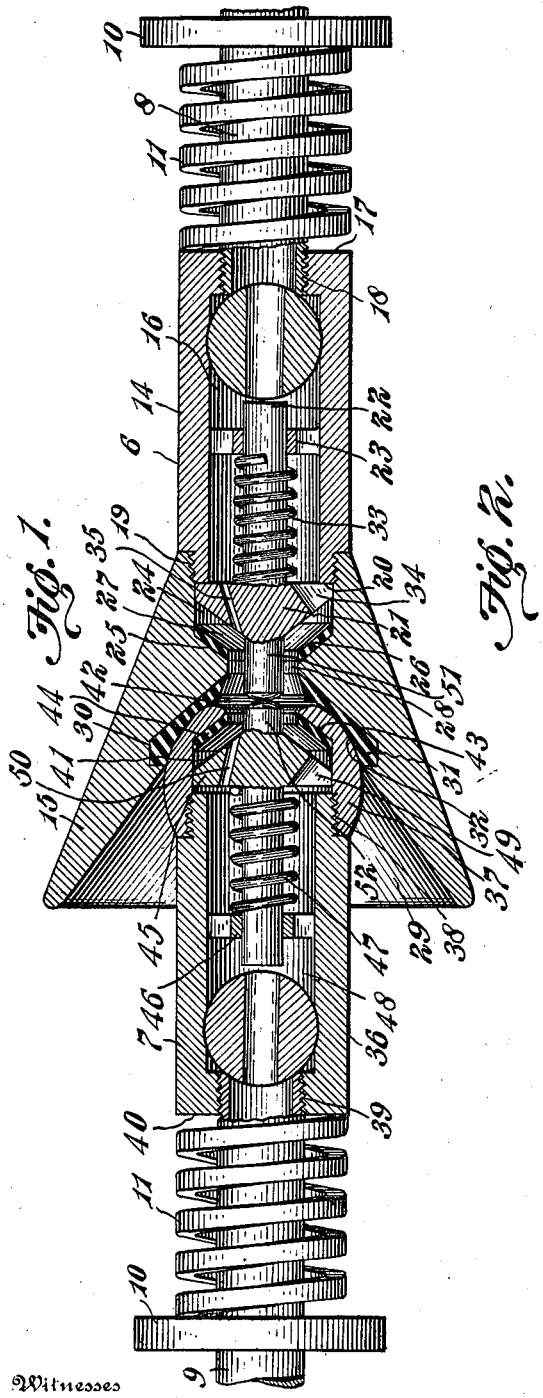
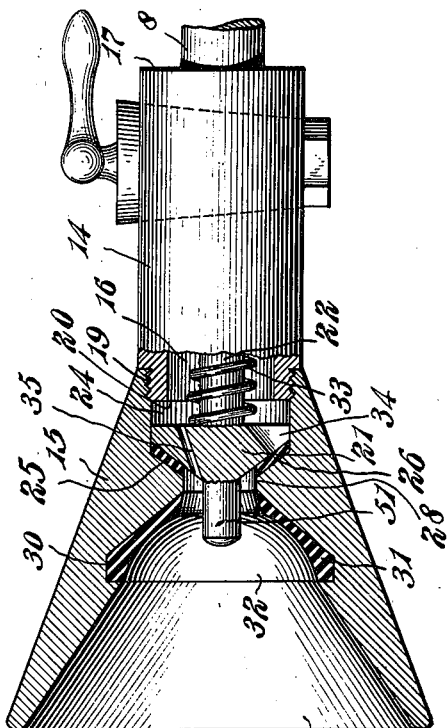
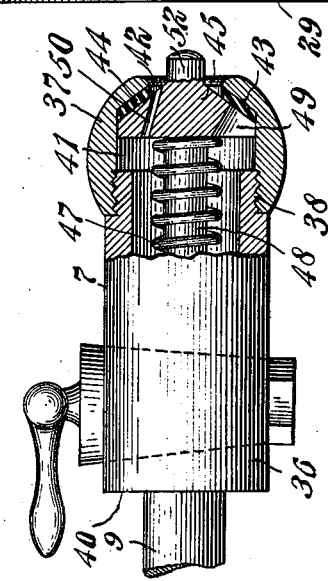
Witnesses
J. W. Bishop.
H. S. Austin.
Inventor
Fred H. Harpster.
By Joshua R. H. Potts,
Attorney F. H. HARPSTER.
AUTOMATIC PIPE COUPLING FOR CARS.
APPLICATION FILED MAY 26, 1909.
950,263.
Patented Feb. 22, 1910.
2 SHEETS—SHEET 2.
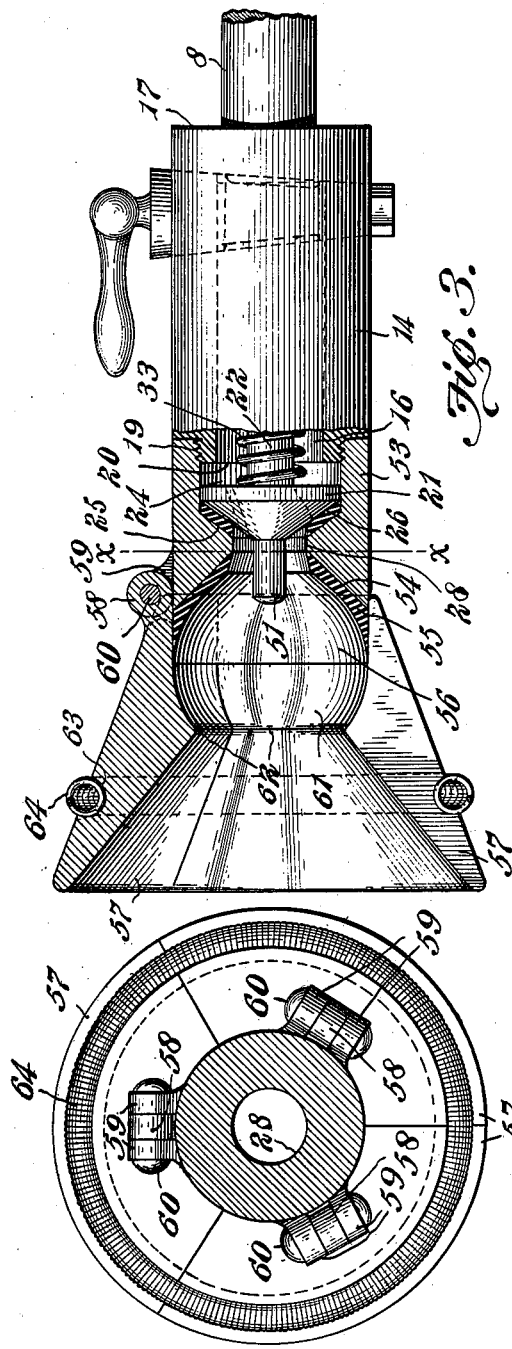
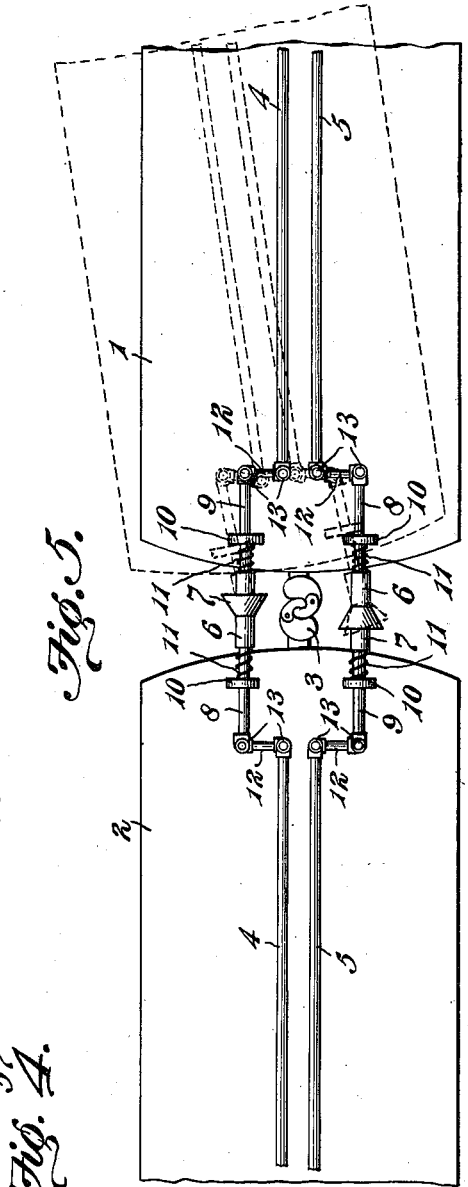
Witnesses
J. H. Bishop.
H. S. Austin.
Inventor
Fred H. Harpster.
By Joshua R. H. Potts,
Attorney

UNITED STATES PATENT OFFICE.

FRED H. HARPSTER, OF HAZLETON, PENNSYLVANIA.

AUTOMATIC PIPE-COUPLING FOR CARS.

950,263. Specification of Letters Patent. Patented Feb. 22, 1910.

Application filed May 26, 1909. Serial No. 498,385.

*To all whom it may concern:*

Be it known that I, FRED H. HARPSTER, a citizen of the United States, residing at Hazleton, county of Luzerne, and State of Pennsylvania, have invented certain new and useful Improvements in Automatic Pipe-Couplings for Cars, of which the following is a specification.

My invention relates to pipe couplings and particularly to pipe couplings for automatically connecting the steam and compressed air train pipes.

The object of my invention is to provide a coupling for train pipes which shall be arranged upon the ends of the cars and automatically couple the train pipes as the cars are coupled.

The further object of my invention is to provide a coupling as mentioned which shall be sufficiently flexible to permit relative movement of the cars, as in rounding curves, without straining the coupling or the train pipes.

The further and particular object of my invention is to provide an automatic train pipe coupling which shall operate to open the pipes for free passage of the steam or air when the parts are connected and to close the same when the parts are separated so as to throw on the brakes gradually, thereby avoiding the shocks and strains incident to throwing on the brakes suddenly.

Other objects will appear hereinafter.

My invention will be more readily understood by reference to the accompanying drawings forming a part of this specification and in which, Figure 1 is the longitudinal section through a pipe coupling embodying my invention in its preferred form, Fig. 2 is a similar view with the parts disconnected, Fig. 3 is a longitudinal section through the socket portion of a modified form of coupler, Fig. 4 is a transverse section of the same on the line *x—x* of Fig. 3, and Fig. 5 is a diagrammatic bottom plan view of the adjacent ends of two cars equipped with train pipe couplings embodying my invention.

The coupling embodying my invention consists generally in a ball member and a socket member adapted to be arranged upon the adjacent ends of the cars and connected to the ends of the train pipes which are arranged beneath the respective cars, means for forming an air or steam tight joint between said members and yieldable or cushioning members for holding the ball and socket members together. The socket member is provided with a conical guide for directing the ball into the socket as the cars are coupled, and both the ball and the socket members are provided with valve seats and valves for closing the ends of the pipes when the members are separated, each valve being provided with a spring for pressing the same outwardly against the valve seat, and also provided with outwardly projecting lugs or pins the ends of which are adapted to engage and unseat the valves when the members are coupled. Each of the valves is provided with a small exhaust port which permits the air to escape slowly after the valves are closed so that should the cars become accidentally separated or uncoupled the brakes will not be thrown on suddenly but will be applied gradually bringing the car or cars to a stop without shock or jar. The ball and socket members are connected to the respective train pipes by flexible joints as will be fully described hereinafter.

Referring now to the drawings, and particularly to Fig. 5, 1 and 2 indicate the adjacent ends of two cars, and 3 the usual car coupling. Arranged beneath the cars are the usual compressed air and steam pipes 4 and 5 respectively. 6 and 7 indicate the socket and the ball members respectively of the pipe couplings which are secured to the outer ends of short pipes 8 and 9 respectively which extend freely through members 10 secured beneath the cars. Springs 11 interposed between the coupling members and the respective members 10 hold the coupling members firmly together and also cushion the same when being coupled. The pipes 8 and 9 lie substantially parallel with the train pipes, and their inner ends are connected to the ends of said train pipes by short pipe sections 12 and the flexible joints 13. It is obvious that with the ball and socket joint 6—7, the springs 11 and the flexible joints 13, the cars may have considerable relative movement without straining the train pipes or the coupling members. The socket member comprises a cylindrical portion 14 and a conical portion 15 secured together in axial alinement. The portion 14 is tubular, having a longitudinal bore 16, and into one end thereof is threaded the end of the pipe 8 as clearly shown in Fig. 1. The diameter of the portion 14 is considerably greater than that of the pipe 8 to form a thrust bearing 17 for one end of the spring 11, and to this end the end of the portion 14 is preferably provided with an inwardly extending annular flange 18 constituting a head into which the pipe 8 is threaded. The opposite end of the portion 14 is reduced in diameter and threaded as at 19 to receive the end of the conical portion 15 and its extreme end 20 forms a stop to limit the movement of the valve to open position as will be fully described hereinafter.

21 indicates the valve having a stem 22 arranged within the bore 16 and working freely in a guide 23 formed within said bore. The portion 15 is provided at its smaller end with a cylindrical bore 24 of substantially the same diameter as the reduced end 20 of the portion 14 and forming a chamber for the valve 21. The portion 24 of the bore terminates in an abrupt shoulder 25 to receive an annular hard rubber or fiber gasket 26, the inner face of which constitutes a conical valve seat 27 for the valve 21. The bore of the portion 15 continues for a short distance with a much reduced diameter as at 28, and then flares outwardly forming a conical portion 29. The inner end of the portion 29 is provided with an annular recess 30 in which is arranged a hard rubber or fiber member 31 having a substantially hemispherical seat 32 which forms the socket proper to receive the ball member. Arranged about the valve stem 22 and interposed between the valve and the guide 23 is a spring 33 which tends to keep the valve normally seated against the valve seat 27.

The valve 21 is provided with a large peripheral passage way 34 which is closed by the valve seat when the valve is resting against the same, and also with a small passage way 35, the end of which is within or nearer the center than the inner end of the gasket in order to permit passage of air or steam therethrough at all times even when the valve is closed.

The ball member 7 of the coupling comprises a cylindrical portion 36 and the ball portion proper 37. The portion 36 is substantially the same as the portion 14 one end being reduced and threaded as at 38 to receive the ball portion, and the other end being provided with an inwardly extending flange 39 which is threaded to receive the end of the pipe 9, and forming a thrust surface 40 for the spring 11. The ball portion 37 is provided with a smooth outer surface to fit snugly against and work freely on the surface 32 of the member 31 forming a tight joint. The portion 37 is formed with a bore 41 which is reduced in diameter at its outer end as at 42 forming an abrupt shoulder at 43 to receive an annular member 44 formed of hard rubber or fiber and constituting a valve seat for a valve 45, the portion 41 of the bore constituting a valve chamber. Interposed between the valve 45 and a guide 46 is a spring 47 which serves to normally hold the valve on the valve seat.

48 indicates the valve stem working freely in the guide 46 and 49 and 50 passage ways or ports through the valve similar in all respects to the ports 34 and 35 of the valve 21.

It is obvious that when the coupling members are separated the valves will be maintained in closed position by their respective springs. Suitable means are provided for automatically opening of the valves as the parts are coupled. To this end the valves are provided or formed with axially extending pins 51 and 52 respectively which engage when the parts are coupled and are of sufficient length to unseat both valves. To insure properly holding the valves in open position the spring 47 is made considerably stronger than the spring 33, thereby holding the valve 21 firmly against the stop 20. When the coupling members are separated either by accidental or intentional separation of the cars, the valves are immediately closed by their respective springs, but the air is permitted to escape slowly from the train pipes through the passages 35 and 50. In this way the brakes are prevented from being thrown suddenly but will be applied gradually, thus avoiding all undue shocks.

In Figs. 3 and 4, I have illustrated a modified form of socket member adapted to be used with a ball member such as illustrated in the preceding form. The chief difference in this form over the preceding is in the ball seat and the conical guide portion, the former being greater than a hemisphere to more fully surround the ball, and the latter being expansible to permit seating and unseating of the ball. In this form the portion 14 is identical with that previously described as is also the valve 21. Threaded upon the reduced end 19 is an extension 53 which is preferably cylindrical and is provided with the valve chamber 24 and the valve seat 26. The outer end of the member 53 is provided with a conical seat 54 to receive a hard rubber or fiber annular member 55, the latter being formed with a semi-cylindrical seat 56 for the ball member. The conical guide portion is formed of a plurality of segmental sections 57 which are hingedly connected at their apex to the member 53. To this end each segment is provided with a hinge lug 58 which is arranged between a pair of similar lugs 59 on the member 53, 60 indicating the hinge pins. The inner faces of the segments 57 near the hinge end are shaped so as together to form a spherical zone 61 which constitutes a continuation of the ball seat 56 and forming a contracted entrance 62 for the ball. The conical portion is provided with a circumferential groove 63 in which is arranged an annular spiral spring 64 which tends to normally hold the device in contracted position but permits expansion of the same to allow the ball to pass the contracted portion 62.

Having described my invention what I claim as new and desire to secure by Letters Patent is:

A train pipe coupling comprising a ball member and a socket member, in combination with valves arranged in said members, means for normally holding said valves in closed position when said members are separated and means for automatically opening said valves as said members are coupled, each of said valves being provided with a minute passage way adapted to remain open at all times substantially as described.

In testimony whereof I have signed my name to this specification in the presence of two subscribing witnesses.

FRED H. HARPSTER.

Witnesses:
CHRIST L. SCHIMFF,
JOHN EDWARD STHORE.